United States Patent [19]

Burke

[11] Patent Number: 5,531,260
[45] Date of Patent: * Jul. 2, 1996

[54] METHOD OF FORMING METAL MATRIX COMPOSITES BY USE OF AN IMMERSION CASTING TECHNIQUE AND PRODUCTS PRODUCED THEREBY

[75] Inventor: John T. Burke, Hockessin, Del.

[73] Assignee: Lanxide Technology Company, Newark, Del.

[ * ] Notice: The portion of the term of this patent subsequent to Mar. 19, 2007, has been disclaimed.

[21] Appl. No.: 366,345

[22] Filed: Dec. 29, 1994

Related U.S. Application Data

[63] Continuation of Ser. No. 136,482, Oct. 13, 1993, Pat. No. 5,377,741, which is a continuation of Ser. No. 951,72, Sep. 28, 1992, abandoned, which is a continuation of Ser. No. 671,049, Mar. 18, 1991, Pat. No. 5,150,747, which is a continuation of Ser. No. 269,371, Nov. 10, 1988, Pat. No. 5,000,249.

[51] Int. Cl.⁶ .................................................. B22D 19/14
[52] U.S. Cl. ................................................. 164/97; 164/98
[58] Field of Search ........................................... 164/97, 98

[56] References Cited

U.S. PATENT DOCUMENTS

| | | | |
|---|---|---|---|
| 2,951,771 | 9/1960 | Butler | 117/114 |
| 3,031,340 | 4/1962 | Girardot | 117/118 |
| 3,149,409 | 9/1964 | Maruhn | 29/156.5 |
| 3,396,777 | 8/1968 | Reding, Jr. | 164/97 |
| 3,547,180 | 12/1970 | Cochran et al. | 164/51 |
| 3,608,170 | 9/1971 | Larson et al. | 29/149.5 |
| 3,868,267 | 2/1975 | Gazza et al. | 264/60 X |
| 3,915,699 | 10/1975 | Umehara et al. | 419/17 |
| 3,969,553 | 7/1976 | Kondo et al. | 427/299 |
| 4,082,864 | 4/1978 | Kendall et al. | 427/248 |
| 4,376,803 | 3/1983 | Katzman | 428/408 |
| 4,376,804 | 3/1983 | Katzman | 428/408 |
| 4,404,262 | 9/1983 | Watmough | 428/539.5 |

(List continued on next page.)

FOREIGN PATENT DOCUMENTS

| | | |
|---|---|---|
| 0071449 | 2/1983 | European Pat. Off. . |
| 0340957 | 11/1989 | European Pat. Off. . |
| 0364963 | 4/1990 | European Pat. Off. . |
| 2819076 | 10/1979 | Germany . |
| 0144441 | 8/1983 | Japan . |
| 2156718 | 10/1985 | United Kingdom . |

OTHER PUBLICATIONS

F. Delannay, L. Froyen, and A. Deruyttere, "Review: The Wetting of Solids by Molten Metals and Its Relation to the Preparation of Metal–Matrix Composites", Journal of Materials Science, vol. 22, No. 1, pp. 1–16, Jan. 1987.

A. Mortensen, M. N. Gungor, J. A. Cornie, and M. C. Flemings, "Alloy Microstructures in Cast Metal Matrix Composites", Journal of Metals, vol. 38, No. 3, pp. 30–35, Mar. 1986.

G. R. Edwards and D. L. Olson, "The Infiltration Kinetics of Aluminum in Silicon Carbide Compacts", Annual Report from Center for Welding Research, Colorado School of Mines, under ONR Contract No. M00014–85–K–0451, DTIC Report AD–A184 682, Jul. 1987.

A. Mortensen, J. A. Cornie, and M. C. Flemings, "Solidification Processing of Metal–Matrix Composites", Journal of Metals, vol. 40, No. 2, pp. 12–19, Feb. 1988.

B. D. Sparks and T. W. Meadow, "The Development of an infiltrated Lead/Iron Composite Material For Use as a Non--toxic Bird Shot", Composites, pp. 37–39, Jan. 1978.

Primary Examiner—Jack W. Lavinder
Assistant Examiner—I.-H. Lin
Attorney, Agent, or Firm—Jeffrey R. Ramberg

[57] ABSTRACT

The present invention relates to a novel method for forming metal matrix composite bodies. Particularly, a permeable mass of filler material is formed into a preform. An infiltration enhancer and/or an infiltration enhancer precursor and/or an infiltrating atmosphere are also in communication with the preform, at least at some point during the process, which permits molten matrix metal to spontaneously infiltrate the preform when the preform is placed into the molten matrix metal. A means for maintaining the preform at least partially below the surface of the molten matrix metal can also be utilized.

19 Claims, 1 Drawing Sheet

U.S. PATENT DOCUMENTS

| | | |
|---|---|---|
| 4,450,207 | 5/1984 | Donomoto et al. ........................ 428/614 |
| 4,473,103 | 9/1984 | Kenney et al. ............................. 167/97 |
| 4,559,246 | 12/1985 | Jones ......................................... 427/299 |
| 4,570,316 | 2/1986 | Sakamaki et al. ..................... 29/156.87 |
| 4,587,177 | 5/1986 | Toaz et al. ................................. 428/614 |
| 4,630,665 | 12/1986 | Novak, Jr. et al. ......................... 167/97 |
| 4,657,065 | 6/1988 | Wada et al. ......................... 148/11.5 A |
| 4,662,429 | 5/1987 | Wada et al. ............................... 164/461 |
| 4,673,435 | 6/1987 | Yamaguchi et al. ....................... 75/235 |
| 4,677,901 | 7/1987 | Ban et al. ................................... 92/213 |
| 4,679,493 | 7/1987 | Munro et al. ............................... 92/212 |
| 4,713,111 | 12/1987 | Cameron et al. ......................... 75/68 R |
| 4,731,296 | 3/1988 | Shindo et al. ............................. 428/611 |
| 4,753,690 | 6/1986 | Wada et al. ............................... 168/461 |
| 4,777,097 | 10/1988 | Kubo et al. ................................ 428/614 |
| 4,802,524 | 2/1989 | Donomoto .................................. 164/97 |
| 4,871,008 | 10/1989 | Dwivedi et al. ............................. 164/6 |
| 4,932,099 | 6/1990 | Corwin ....................................... 164/97 |
| 5,000,248 | 3/1991 | Newkirk et al. ........................... 164/97 |
| 5,000,249 | 3/1991 | Burke ......................................... 164/97 |
| 5,150,747 | 9/1992 | Burke ......................................... 164/97 |
| 5,377,741 | 1/1995 | Burke ......................................... 164/97 |

METHOD OF FORMING METAL MATRIX COMPOSITES BY USE OF AN IMMERSION CASTING TECHNIQUE AND PRODUCTS PRODUCED THEREBY

CROSS-REFERENCE TO RELATED APPLICATION

This application is a continuation application of U.S. patent application Ser. No. 08/136,482, filed Oct. 13, 1993 and now issued as U.S. Pat. No. 5,377,741, which is a continuation application of U.S. patent application Ser. No. 07/951,972, filed Sep. 28, 1992 and now abandoned, which is a continuation application of U.S. patent application Ser. No. 07/671,049, filed Mar. 18, 1991 and now issued as U.S. Pat. No. 5,150,747, which is a continuation application of U.S. patent application Ser. No. 07/269,371, filed Nov. 10, 1988 and now issued as U.S. Pat. No. 5,000,249, in the name of John T. Burke, and all of which are entitled "Method of Forming Metal Matrix Composites by Use of an Immersion Casting technique and Products Produced thereby"

FIELD OF INVENTION

The present invention relates to a novel method for forming metal matrix composite bodies. Particularly, a permeable mass of filler material is formed into a preform. An infiltration enhancer and/or an infiltration enhancer precursor and/or an infiltrating atmosphere are also in communication with the preform, at least at some point during the process, which permits molten matrix metal to spontaneously infiltrate the preform when the preform is placed into the molten matrix metal. A means for maintaining the preform at least partially below the surface of the molten matrix metal can also be utilized.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer is present at least at some point during the process.

DESCRIPTION OF COMMONLY OWNED U.S. PATENT APPLICATIONS

The subject matter of this application is related to that of several other copending and co-owned patent applications. Particularly, these other copending patent applications describe novel methods for making metal matrix composite materials (hereinafter sometimes referred to as "Commonly Owned Metal Matrix Patent Applications").

A novel method of making a metal matrix composite material is disclosed in Commonly Owned U.S. patent application Ser. No. 049,171, filed May 13, 1987, in the names of White et al., and entitled "Metal Matrix Composites", now U.S. Pat. No. 4,828,008, which issued on May 9, 1989. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and U.S. Pat. No. 4,935,055, which issued on Jun. 19, 1990, from U.S. patent application Ser. No. 141,642, filed Jan. 7, 1988, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and U.S. Pat. No. 5,298,339, which issued on Mar. 29, 1994, from U.S. patent application Ser. No. 07/994,064, filed Dec. 18, 1992, which is a continuation of application Ser. No. 07/759,745, filed Sep. 12, 1991, which is a continuation of application Ser. No. 07/517,541, filed Apr. 24, 1990, now abandoned, which was a continuation of application Ser. No. 168,284, filed Mar. 15, 1988, in the names of Michael K. Aghajanian and Marc S. Newkirk and entitled "Metal Matrix Composites and Techniques for Making the Same." In accordance with the methods disclosed in this U.S. patent a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by spontaneously infiltrating a permeable mass of filler material which has been formed into a preform. Specifically, a matrix metal is made molten and the matrix metal is held within an appropriate nonreactive vessel for housing matrix metal (e.g., a suitable refractory container) to form a pool of molten matrix metal. The preform can then be placed into the molten matrix metal to obtain spontaneous infiltration. An infiltration enhancer and/or an infiltration enhancer precursor and/or an infiltrating atmosphere are also in communication with the preform, at least at some point during the process, thereby permitting molten matrix metal to spontaneously infiltrate the preform when the preform is placed into the molten matrix metal.

The preform may exhibit a natural tendency to float adjacent or on a surface of molten matrix metal due to its natural buoyancy relative to the molten matrix metal. However, it may be desirable to submerge completely the preform in the molten matrix metal. However, prior to such complete submersion, the preform preferably should contain at least one of an infiltration enhancer and/or infiltration enhancer precursor. Under such conditions, molten matrix metal will spontaneously infiltrate the submerged preform. Alternatively, the molten matrix metal can contain an infiltration enhancer or an infiltration enhancer precursor in addition to or in lieu of the infiltration enhancer or infiltration enhancer precursor in the preform. If an infiltration enhancer precursor is included only in the molten matrix metal, some means must be provided for contacting such precursor with another material (e.g., an infiltrating atmosphere which could be bubbled into the molten matrix metal).

In a preferred embodiment, a shaped preform can be made by including a filler material comprising an infiltration enhancer precursor and a ceramic material within a mold. The molded filler material and infiltration enhancer precursor can thereafter be exposed to an infiltrating atmosphere to rigidize the preform and form infiltration enhancer within the preform. The preform, now containing infiltration enhancer, can thereafter be submerged in molten matrix metal by an appropriate means for removably submerging the preform in the matrix metal. For example, the preform may be contained within a removable cage which physically forces the preform below the surface of the molten matrix metal, or the preform may be attached to a ballasting means which counters the buoyancy of the preform relative to the molten matrix metal. Irrespective of the means for removably submerging the preform that is used, if at least one infiltration enhancer is provided in the preform, the infiltrating atmosphere may no longer be required to achieve the spontaneous infiltration of the molten matrix metal into the preform. However, such infiltration atmosphere or, at a minimum, an inert atmosphere may still be required to be present so that a surface of the pool of matrix metal that contacts the atmosphere remains nonreactive.

Moreover, it is possible that in addition to the spontaneous infiltration mechanism, a tendency to create a self-generated vacuum within the submerged preform may also occur (e.g., molten matrix metal may react with trapped atmosphere in the preform thus creating a tendency for the molten matrix metal to infiltrate the preform).

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the aluminum/magnesium/nitrogen system. For example, spontaneous infiltration behavior has been observed in the aluminum/strontium/nitrogen system; the aluminum/zinc/oxygen system; and the aluminum/calcium/nitrogen system. Accordingly, although the aluminum/magnesium/nitrogen system is discussed primarily herein, it will be understood that other matrix metal/infiltration enhancer precursor/infiltrating atmosphere systems behave in a similar manner.

When the matrix metal comprises an aluminum alloy, the aluminum alloy may contact a preform comprising a filler material (e.g., alumina or silicon carbide particles), said filler material having admixed therewith, and/or at some point during the process being exposed to, magnesium. Moreover, in a preferred embodiment, the aluminum alloy and preform are contained in a nitrogen atmosphere for at least a portion of the process. The preform will thus be spontaneously infiltrated by the matrix metal and the extent or rate of spontaneous infiltration and formation of metal matrix composite will vary with a given set of process conditions including, for example, the concentration of magnesium provided to the system (e.g., in the aluminum alloy and/or in the preform and/or in the infiltrating atmosphere), the size and/or composition of the particles in the preform, the concentration of nitrogen in the infiltrating atmosphere, the time permitted for infiltration, and/or the temperature at which infiltration occurs. Spontaneous infiltration typically occurs to an extent sufficient to embed substantially completely the preform with the matrix metal.

Definitions

"Aluminum", as used herein means, and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ballasting Means" or "means for ballasting", as used herein, means a device which counteracts the natural buoyancy of the preform relative to the molten matrix metal, such that when said means is attached to a preform, the preform is maintained at a point below the surface of molten matrix alloy.

"Balance Non-Oxidizing Gas", as used herein, means that any gas present in addition to the primary gas comprising the infiltrating atmosphere is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity, is not substantially volatile (i.e., the barrier material does not volatilize to such an extent that it is rendered nonfunctional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/ infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever virgules ("/") appear between an exemplary matrix metal, infiltration enhancer precursor and infiltrating atmosphere, the virgules are used to designate a system or combination of materials which, when combined in a particular manner, exhibits spontaneous infiltration into a preform or filler material.

"Means for Removably Submerging" or "Removable Submerging Means", as used herein, means a suitable device which attaches to or supports at least one preform such that said means can at least partially submerge the preform below a surface of a pool of molten matrix alloy and remove the preform from the molten matrix alloy pool.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain molten matrix metal under the process conditions and not react with the matrix and/or the infiltrating atmosphere and/or infiltration enhancer precursor in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF FIGURES

The following figures are provided to assist in understanding the invention, but are not intended to limit the scope of the invention. Similar reference numerals have been used wherever possible in each of the Figures to denote like components, wherein.

DETAILED DESCRIPTION OF THE
INVENTION AND PREFERRED
EMBODIMENTS

The present invention relates to forming a metal matrix composite body by submerging any suitable preform within a molten matrix metal, the preform being typically formed of a filler material, as described in more detail below, and contacting, at some point during the process, at least one of an infiltration enhancer and/or infiltration enhancer precursor and/or an infiltrating atmosphere, which results in the molten matrix metal spontaneously infiltrating the preform to a desired extent.

Figure 1A:
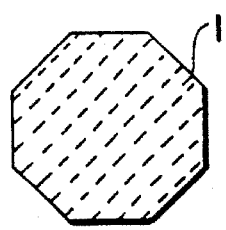
FIG. 1a shows a generalized preform suitable for use with the present invention.
Figure 1B:
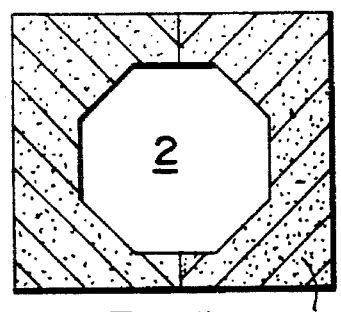
FIG. 1b shows a reusable mold for forming the generalized preform.

Referring to the Figures in which like reference numerals identify like parts throughout, FIGS. 1a and 1b show a generalized preform (1) that can be employed in accordance with the present invention. The preform (1) may comprise, for example, a mixture of ceramic particles and an infiltration enhancer, which may be formed by a reaction between an infiltrating atmosphere and an infiltration enhancer precursor, that is given a desired shape by a cavity (2) in a mold (3). The mold (3) may be reusable, in which case it may be composed of a suitably rugged yet readily formable material, such as plaster of Paris or silicone rubber or the like, or the mold (3) may be consumed during subsequent process steps, in which case it may be composed of a material, such as metal foil, that does not affect the spontaneous infiltration process. Mold (3) may be a split mold, multi-piece mold, investment shell mold or any other suitable molding means.

Figure 2:
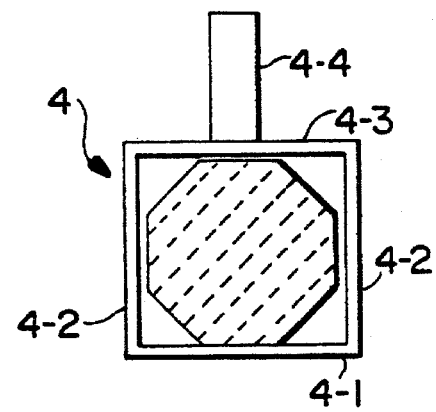
FIG. 2 shows a means for removably submerging the preform in accordance with the present invention.

As shown in FIG. 2, the preform (1), whether still encased in a consumable mold or free-standing, can be placed in a means (4) for removably submerging the preform in a pool of molten matrix metal. The more important characteristics of the means (4) are that the means (4) support or attach to the preform (1) to counteract the natural buoyancy of the preform in the pool of matrix metal without affecting the shape of the preform, that the means (4) permit contact of the preform by the pool, that the means (4) be sufficiently temperature resistant and chemically inactive to withstand immersion in the pool of matrix metal and that the means (4) not deleteriously affect the spontaneous infiltration process. One suitable means (4) comprises a base (4-1), a plurality of rods (4-2), and a removable cap (4-3). A suitable handle (4—4) may be conveniently attached to the means (4), permitting insertion and withdrawal of the means (4) from the pool of matrix metal as well as other desired handling operations. It will be appreciated that the means (4) may also comprise any basket or mesh that is permeable to the matrix metal and has the other aforementioned important characteristics of the means (4). In addition, the means (4) may comprise merely a base and a handle, with one or more preforms removably secured to the base.

Figure 3:
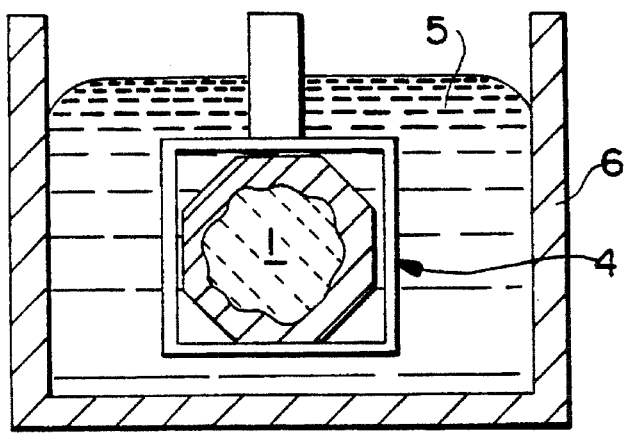
FIG. 3 shows a spontaneous infiltration arrangement in accordance with the present invention.
Figure 4:
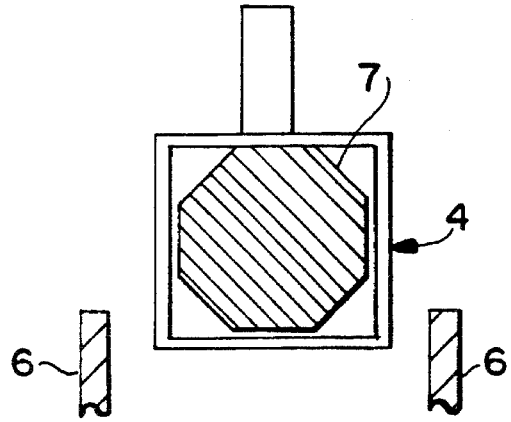
FIG. 4 shows removal of a metal matrix composite body using the removably submerging means.

Referring to FIG. 3, in accordance with the present invention, the means (4) for removably submerging the preform (1) is placed into a pool (5) of molten matrix metal that is confined by a nonreactive vessel (6) for housing matrix metal. In a suitable spontaneous system, such as those described herein, the matrix metal (5) spontaneously infiltrates the preform (1). As shown in the FIG., the preform (1) may be completely submerged in the pool (5) in which case spontaneous infiltration of the preform can proceed from all preform surfaces in contact with the pool. After the desired amount of infiltration has occurred, resulting in formation of a metal matrix composite body (7), as shown in FIG. 4, the means (4) and the included composite body (7) may be withdrawn from the pool. Matrix metal which has not infiltrated the preform but is withdrawn with the means (4) may then return under the impetus of gravity or other suitable force, such as a gas flow, to the pool of molten matrix metal, thereby minimizing the carcass adhering to the composite body (7).

It will be appreciated that the means for removably submerging the preform in the pool of molten matrix metal may only partially rather than fully submerge the preform. Such partial submergence may be desirable, for example, when spontaneous infiltration should occur only in a preferred direction or in a portion of a preform. As discussed in greater detail below, suitable barrier means may be adhered to selective surfaces of the preform to control the direction of infiltration or to minimize any remaining carcass of matrix metal such that net or near net shape is obtained upon removal of the barrier.

In addition, the depth of submergence of the preform in the pool may be selectively controllable, for example, to vary the composition of the metal matrix composite body. Such variation might be achieved with a stratified pool having different matrix metal compositions at different depths. Such different compositions might result from a depth-dependent temperature gradient and/or alloy mixture. The removable submerging means would effect contact between the preform and a first matrix metal composition at a first depth for a predetermined time period, and subsequently would effect contact between the partially spontaneously infiltrated preform and a second matrix metal composition at a second depth for a second predetermined time period. Additional metal matrix compositions could be contacted according to their locations in the molten metal pool.

Further, more than one preform may be simultaneously supported by the removable submerging means, thereby increasing the rate of production of metal matrix composite bodies. The preforms could be loosely arranged within the submerging means or removably attached thereto, as appropriate. It will be understood that the volume of the pool of molten matrix metal would increase to an extent sufficient to provide the desired degree of infiltration of the plurality of metal matrix composite bodies produced in this manner.

As already discussed, one characteristic of the removable submerging means may be that it counteracts any natural buoyancy, whether positive or negative, of the preform relative to the pool of molten matrix metal. It will be understood that other devices can be employed to carry out this and other functions. One such alternate device is a means for ballasting the preform, an embodiment of which is described in more detail below in connection with the example. The ballasting means in accordance with the present invention generally has characteristics similar to those of the removable submerging means.

In order to effect spontaneous infiltration of the matrix metal into the preform, an infiltration enhancer should be provided to the spontaneous system. The infiltration enhancer could be formed from an infiltration enhancer precursor which may be provided (1) in the matrix metal and/or (2) in the preform and/or (3) from the infiltrating atmosphere and/or (4) from an external source into the spontaneous system. Moreover, rather than an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be located in at least a portion of the filler material or preform. For example, when supplied to the infiltrating atmosphere, the infiltration enhancer could be transported to a submerged preform by bubbling the atmosphere through the pool of molten matrix metal. If the preform were not fully submerged, infiltration enhancer could be provided to the preform through an infiltrating atmosphere above the surface of the pool. Similarly, if an infiltration enhancer precursor is provided in the preform, such precursor can be converted to an infiltration enhancer by bubbling the infiltrating atmosphere through the pool or by exposing a surface of the preform to the infiltrating atmosphere above the pool.

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not react with the aluminum matrix metal when the aluminum is made molten. A preform can then be maintained below the surface of and in contact with molten matrix metal by the ballasting means or the means for removable submerging the preform within molten matrix metal.

In accordance with the present invention in the case of an aluminum/magnesium/nitrogen spontaneous system, the preform should be sufficiently permeable to permit the nitrogen-containing gas to penetrate or permeate the preform at least at some point during processing e.g., by bubbling nitrogen through the molten matrix metal. Moreover, the permeable preform can simultaneously or thereafter accommodate infiltration of the molten matrix metal or exposing the preform to nitrogen before immersion, thereby causing the nitrogen-permeated preform to be infiltrated spontaneously with molten matrix metal to form a metal matrix composite body and/or causing the nitrogen to react with an infiltration enhancer precursor to form infiltration enhancer in the preform resulting in spontaneous infiltration.

The extent of spontaneous infiltration and formation of the metal matrix composite will vary with a given set of process conditions, including, for the aluminum/magnesium/nitrogen system, the magnesium content of the aluminum alloy, magnesium content of the preform, magnesium nitride content of the aluminum alloy, magnesium nitride content of the preform, the presence of additional alloying elements (e.g., silicon, iron, copper, manganese, chromium, zinc, and the like), average size (e.g., particle diameter) of the filler material comprising the preform, surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum matrix metal can be alloyed with at least about 1% by weight, and preferably at least about 3% by weight, magnesium (which functions as the infiltration enhancer precursor), based on alloy weight.

Auxiliary alloying elements, as discussed above, may also be included in the matrix metal to tailor specific properties thereof. The auxiliary alloying elements may also affect the minimum amount of magnesium required in the matrix aluminum metal to result in spontaneous infiltration of the filler material or preform. Loss of magnesium from the spontaneous system due to, for example, volatilization should be avoided to such an extent that some magnesium remains to form infiltration enhancer. Thus, it is desirable to utilize a sufficient amount of initial alloying elements to assure that spontaneous infiltration will not be adversely affected by volatilization. Still further, the presence of magnesium in both the preform and the matrix metal or the preform alone may result in a reduced total amount of magnesium needed to achieve spontaneous infiltration (discussed in greater detail later herein). The volume percent of nitrogen in the nitrogen infiltrating atmosphere also affects formation rates of the metal matrix composite body. Specifically, if less than about 10 volume percent of nitrogen is present in the infiltrating atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. Shorter infiltration times may also be achievable by gently agitating the submerged preforms, thereby swirling the molten matrix metal around the preforms without disturbing their structural integrity.

The minimum magnesium content required for molten matrix metal in the aluminum/magnesium/nitrogen spontaneous system to form a metal matrix composite depends on one or more variables such as the processing temperature, time, the presence of auxiliary alloying elements such as silicon or zinc, the nature of the filler material, the location of the magnesium in one or more components of the spontaneous system, the nitrogen content of the infiltrating atmosphere reaching the preform, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000 C into a bedding of 500 mesh, 39 Crystolon (99 percent pure silicon carbide from Norton Co.). However, in the presence of magnesium, silicon has been found to promote the infiltration process.

As a further example, the amount of magnesium can be varied if it is supplied exclusively to the preform or filler material. It has been discovered that spontaneous infiltration will occur with a lesser total weight percent of magnesium supplied to the system when at least some of the total amount of magnesium supplied is placed in the preform or filter material. Such placement can be carried out, for example, by mixing a magnesium a powder with ceramic to form the filler. It may be desirable for a lesser total amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the infiltration enhancer or infiltration enhancer precursor to be alloyed with the matrix metal, but rather, simply supplied to the spontaneous system). If the magnesium was applied to a surface of the matrix metal, it may be preferred that said surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the gas surrounding the preform and matrix metal also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler material, also tends to affect the extent of infiltration at a given temperature. Consequently, in some cases where little or no magnesium is contacted directly with the filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g. to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Moreover, satisfactory pourability of the resulting suspension, after the second matrix metal has been dispersed, is achievable at or about 800° C. or greater, and possibly lower, depending upon the nature of the suspension. Pourability does not necessarily improve with increased temperatures. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable preform is submerged within molten aluminum in the presence of, at least sometime during the process, a nitrogen-containing gas. The nitrogen-containing gas may be supplied by maintaining a continuous flow of gas into contact with at least one of the preform and molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air or other gases which can have an oxidizing effect on the molten metal and/or the preform.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g., alumina; (b) carbides, e.g., silicon carbide; (c) borides, e.g., aluminum dodecaboride, and (d) nitrides, e.g., aluminum nitride. If there is a tendency for the filler material to react with the molten aluminum matrix metal, this may be accommodated by minimizing the infiltration time and temperature or by providing a non-reactive coating on the filler. The filler material may alternatively comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filaments, such as multifilament tows. Further, the filler material or preform may be homogeneous or heterogeneous.

It also has been discovered that certain filler materials exhibit enhanced infiltration relative to filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, entitled "Methods of Making Composite Ceramic Having Embedded Filler", which issued on Jul. 25, 1989, from Commonly Owned application Ser. No. 819,397, entitled "Composite Ceramic Articles and Methods of Making Same", in the names of Marc S. Newkirk et al., also exhibit desirable infiltration properties relative to commercially available alumina products. The subject matter of each of the issued Patents is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patents.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable (i.e., permeable to molten matrix metal and to the infiltrating atmosphere).

The method of forming metal matrix composites according to the present invention, not being dependent on the use of pressure to force or squeeze molten metal matrix into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix be not reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Alternatively, processing time may be reduced by selectively controlling the depth to which the preform is submerged, as discussed above. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means in the aluminum/magnesium/nitrogen system are graphite and alumina, and these materials may be suitably shaped and disposed to conduct the infiltrating atmosphere to the preform, even while it is wholly submerged. A suitable barrier thus can facilitate production of metal matrix composite bodies by minimizing the amount of post-infiltration surface preparation while maintaining flexibility in disposition of the infiltration enhancer, infiltration enhancer precursor and infiltrating atmosphere components of a spontaneous system. In addition, the barrier means may be combined with the removable submerging means or the ballasting means, thereby providing additional protection for preforms which may not be sufficiently rigid to withstand unsupported submergence into the pool of molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred graphite is a graphite tape product that is sold under the trademark Grafoil®, registered to Union Carbide. This graphite tape exhibits sealing characteristics that prevent the migration of molten aluminum alloy beyond the defined surface boundary of the filler material. This graphite tape is also resistant to heat and is chemically inert. Grafoil®graphite material is flexible, compatible, conformable and resilient. It can be made into a variety of shapes to fit any barrier application. However, graphite barrier means may be employed as a slurry or paste or even as a paint film around and on the boundary of the filler material. Grafoil® is particularly preferred because it is in the form of a flexible graphite sheet. In use, this paper-like graphite is simply formed around the filler material.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1–30 microns). The barrier metals may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Various demonstrations of the present invention are included in the Example immediately following. However, this Example should be considered as being illustrative and should not be construed as limiting the scope of the invention as defined in the appended claims.

EXAMPLE 1

A filler material was prepared by thoroughly mixing 1000 grit silicon carbide powder (39 Crystolon from Norton Co.) with about 2 weight percent of 325 mesh magnesium powder (available from Johnson Mathey Co.). The filler was poured into a thin-walled copper tube, such as the 0.8 mm-thick forms available from General Copper Co. One end of the tube was wrapped in a thin copper foil to seal the tube as the filler was poured into it, and the filler was settled into the mold by tapping the side of the copper tube several times. The tube was approximately 10 cm long and 2.9 cm in diameter, and it served merely as a mold for the filler.

Figure 5:
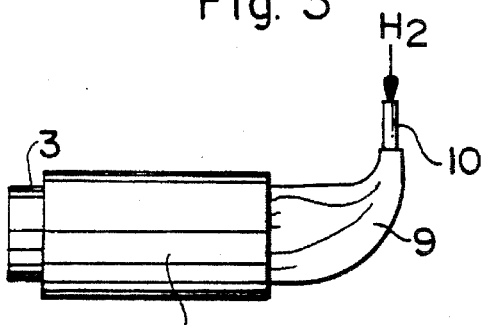
FIG. 5 shows a consumable mold and a ballasting means.

As shown in FIG. 5, the copper mold (3) was then inserted into an alumina tube (8) which served as a ballasting means for the mold. The alumina tube was a 3.8 cm-diameter, 3 mm-wall, high density porcelain crucible (available from Coors Co.) that was reduced to a length of approximately 7.6 cm. The nature of the ballast can be important in that it must be free of water or other materials that can oxidize at process temperatures, thereby contaminating the filler or the matrix metal. In addition, it should be non-wettable by the matrix metal and the matrix metal composite, thereby permitting easy removal of the composite. Furthermore, the ballast should be sufficiently massive to submerge the mold in the matrix metal, and it should be sufficiently rigid to avoid deformation of the metal matrix composite during removal from the molten matrix metal. In at least these respects the ballasting means shares many characteristics of a barrier means.

After the mold (3) was filled, its open end was also wrapped in a thin copper foil (9) through which a 0.6 mm-diameter stainless steel tube (10) was inserted. A flow of nitrogen gas was introduced through the stainless steel tube (10) at a rate of about 1.5 liters/minute. The mold (3)

and tubes (8) and (10) were placed in an electric-resistance-heated furnace, and heated from room temperature to about 600° C. over a time period of approximately 2 hours. The temperature was maintained at 600° C. for about 1 hour, after which time the filler had rigidized into a preform and would have retained its shape even without the mold (3). It will be understood that other temperatures for rigidizing may be used, such as 500° C. and 600° C., depending on the nature of the filler and the mold and its metal foil end caps. Ordinarily higher temperatures are preferred to ensure thorough rigidizing of the filler.

Figure 6:
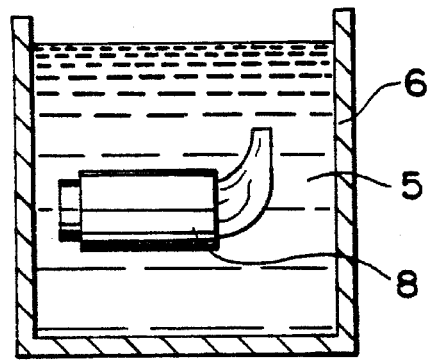
FIG. 6 shows the mold and the ballasting means submerged in a pool of matrix metal.

After one hour at 600° C., the mold (3) was quickly removed from the furnace and plunged into a pool of molten matrix metal alloy that was maintained at about 750° C. in a second electric-resistance-heated furnace. The composition of the matrix metal was an aluminum alloy containing about 12 percent by weight silicon and about 3 percent by weight magnesium (Al-12Si-3 Mg). As shown in FIG. 6, the alumina tube (8) was sufficiently massive to overcome the positive buoyancy of the mold (3), thereby completely submerging the mold (3), in the pool (5) of matrix metal alloy. The flow of nitrogen gas into the mold (3) was maintained at all times until the mold (3) was submerged in the pool (5), after which the flow of nitrogen was directed just above the surface of the pool (5).

After submersion in the pool (5) for approximately one hour, the copper mold (3) and foils had melted and dispersed within the matrix metal alloy, and the matrix metal alloy had spontaneously infiltrated the entire rigidized preform, thereby forming a metal matrix composite body. The preform maintained its shape even after consumption of the mold (3), probably as a result of magnesium nitride formation and possible sintering during the initial heating, and thereafter from the high proportion of filler in the composite body. The alumina tube (8) including the metal matrix composite body was then scooped from the pool of matrix metal alloy. After solidification, the composite body was easily removed from the alumina tube (8), exhibiting good surface smoothness and net shape characteristics.

What is claimed is:

1. A method for forming a metal matrix composite body comprising:

forming a pool of molten matrix metal;

forming at least one preform comprising a permeable mass of a substantially non-reactive filler material;

providing an infiltration enhancer to at least one of said pool of molten matrix metal and said preform;

communicating an inert atmosphere with at least said pool of molten matrix metal;

completely submerging said at least one preform into said pool, said pool lacking a quantity of said matrix metal sufficient to completely infiltrate said at least one preform;

spontaneously infiltrating at least a portion of said at least one preform with said molten matrix metal, thereby forming at least one partially infiltrated preform;

adding an additional quantity of said molten matrix metal to said pool of molten matrix metal, thereby replenishing at least a portion of said molten matrix metal which has infiltrated said preform; and continuing said infiltrating of said at least one preform to a desired extent.

2. The method of claim 1, wherein said filler material comprises at least one material selected from the group consisting of oxides, carbides, borides and nitrides.

3. The method of claim 1, wherein said filler material comprises at least one ceramic material.

4. The method of claim 1, wherein said filler material comprises at least one material selected from the group consisting of powders, flakes, platelets, microspheres, whiskers, bubbles, fibers, particulates, fiber mats, chopped fibers, spheres, pellets, tubules and refractory cloths.

5. The method of claim 1, wherein said filler material comprises at least one material selected from the group consisting of aluminum oxide, silicon carbide, aluminum dodecaboride and aluminum nitride.

6. The method of claim 1, further comprising the step of defining a surface boundary of said at least one preform with a barrier, wherein said matrix metal spontaneously infiltrates up to the barrier.

7. The method of claim 1, wherein said matrix metal comprises aluminum and at least one alloying element selected from the group consisting of silicon, iron, copper, manganese, chromium, zinc, calcium, magnesium and strontium.

8. The method of claim 1, further comprising withdrawing said at least one at least partially infiltrated preform from said pool of molten matrix metal upon achieving said desired extent of infiltration.

9. The method of claim 1, further comprising a means for ballasting said at least one preform to counteract a natural buoyancy of said at least one preform relative to said pool of molten matrix metal.

10. The method of claim 1, wherein said at least one preform is disposed within a removable means for submerging said preform.

11. A method for forming a metal matrix composite body comprising:

providing a source of matrix metal, said source comprising a pool of molten matrix metal;

forming at least one preform comprising a permeable mass comprising (a) at least one substantially non-reactive filler material and (b) an infiltration enhancer, said permeable mass contained within a permeable mold;

in the presence of an inert atmosphere, immersing said at least one preform into said pool of molten matrix metal, said immersing comprising completely submerging said at least one preform beneath a top surface of said pool;

spontaneously infiltrating at least a portion of said at least one preform with molten matrix metal, thereby forming at least one at least partially infiltrated preform;

supplying an additional quantity of said molten matrix metal to said pool of molten matrix metal, thereby replenishing said source of matrix metal; and continuing said infiltrating of said preform to a desired extent.

12. The method of claim 1, wherein said infiltration enhancer is provided to said preform.

13. The method of claim 1, wherein said inert atmosphere comprises an atmosphere which is non-reactive with said molten matrix metal and which atmosphere does not comprise an infiltrating atmosphere.

14. The method of claim 11, wherein said desired extent comprises substantially complete infiltration.

15. The method of claim 11, wherein said infiltrating is conducted in the absence of an infiltrating atmosphere.

16. The method of claim 1, wherein said infiltration enhancer comprises a reaction product involving an infiltration enhancer precursor as a reactant.

17. The method of claim 16, wherein said infiltration enhancer precursor comprises at least one member selected from the group consisting of strontium, calcium and zinc.

18. The method of claim 11, wherein said pool of molten matrix metal is insufficient in quantity to completely infiltrate said at least one preform.

19. The method of claim 18, wherein said replenishing provides a sufficient quantity of molten matrix metal to completely infiltrate said at least one preform.

* * * * *